(No Model.) 2 Sheets—Sheet 1.
E. E. HARDY.
BICYCLE.
No. 465,475. Patented Dec. 22, 1891.
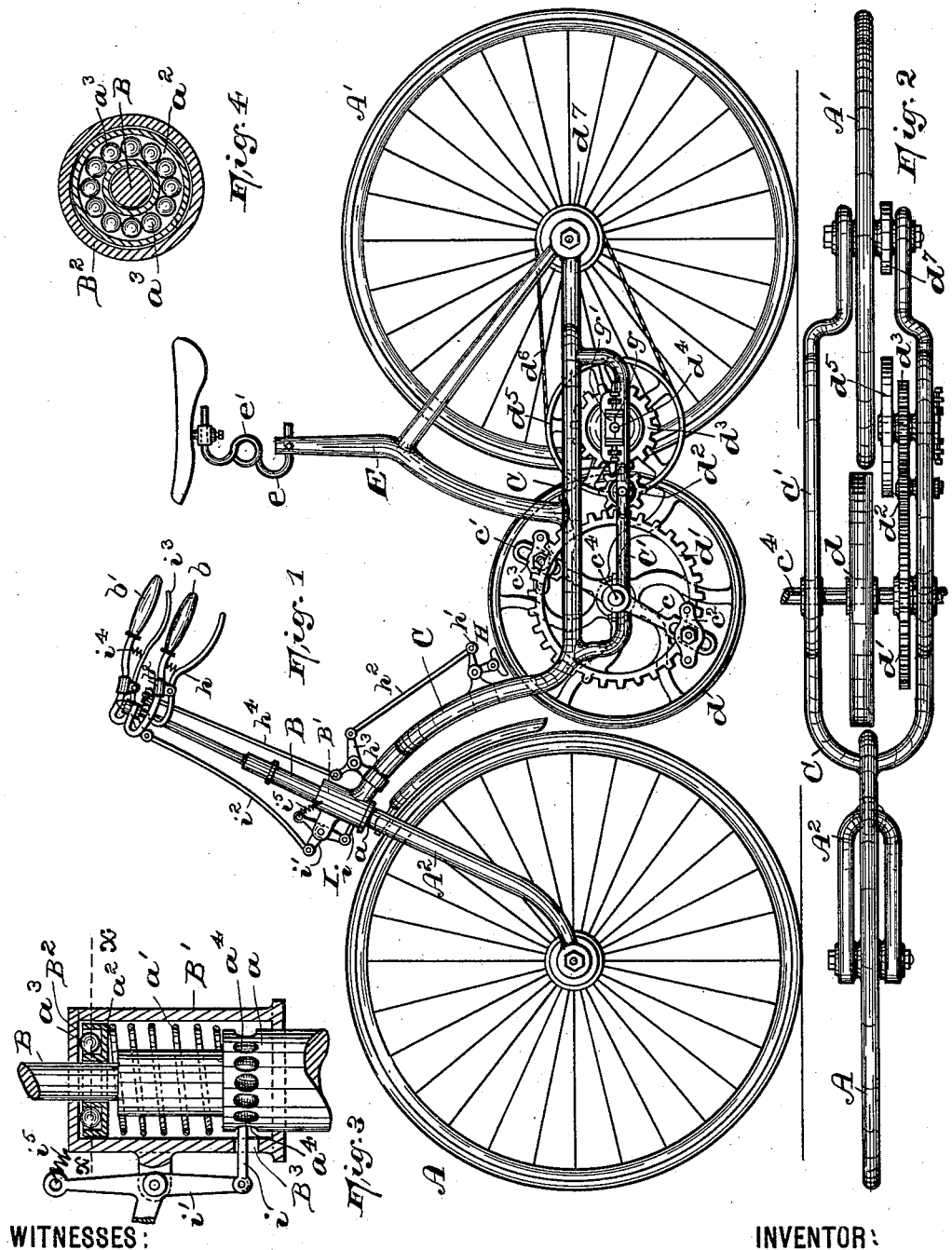
WITNESSES:
Wm. H. Canfield
Arthur Cresse
INVENTOR:
Emery E. Hardy,
BY Fred'k C. Fraentzel, ATT'Y.

(No Model.) 2 Sheets—Sheet 2.
E. E. HARDY.
BICYCLE.
No. 465,475. Patented Dec. 22, 1891.
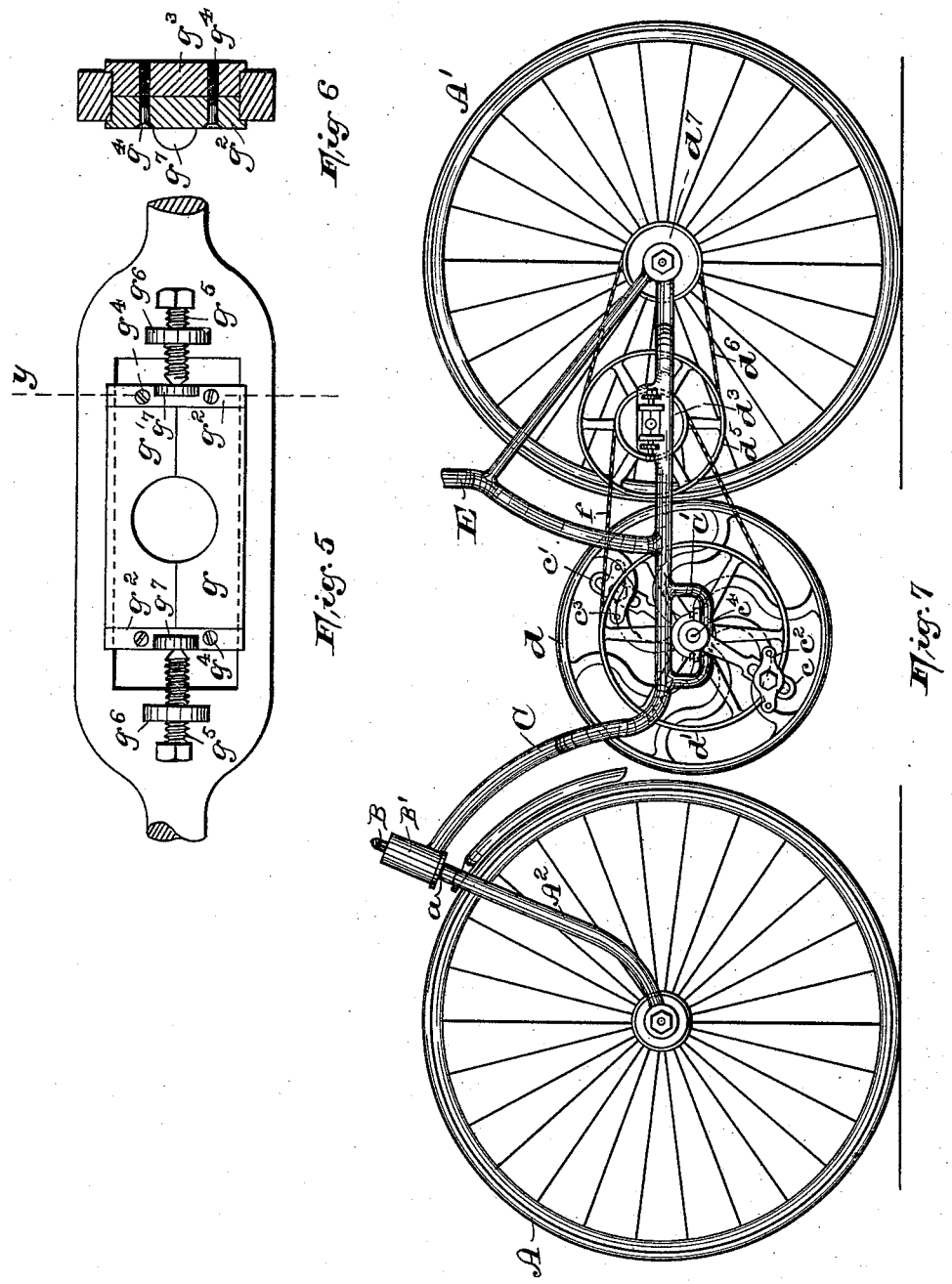

UNITED STATES PATENT OFFICE.

EMERY E. HARDY, OF NEWARK, NEW JERSEY.

BICYCLE.

SPECIFICATION forming part of Letters Patent No. 465,475, dated December 22, 1891.

Application filed April 15, 1891. Serial No. 388,965. (No model.)

*To all whom it may concern:*

Be it known that I, EMERY E. HARDY, a citizen of the United States, residing at Newark, in the county of Essex and State of New Jersey, have invented certain new and useful Improvements in Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my present invention is to provide a driving-gear for velocipedes provided with a fly or balance wheel which may be operated by cranks and pedals.

The invention therefore consists of various improvements in the driving-gear and the main frame provided with a fly or balance wheel.

The invention consists, further, of a brake device adapted to "brake" with the rim of the fly-wheel, whereby the wear and tear upon the rubber tires on the front and rear wheels of the machine are greatly diminished.

The invention, which therefore consists in the improved bicycle and in the arrangements and combinations of parts to be hereinafter more fully described, and finally embodied in the clauses of the claim, as will be seen from the drawings, is applied to a bicycle of the Safety type.

In the accompanying two sheets of drawings, in which similar letters of reference are employed, Figure 1 is a side elevation of a Safety bicycle having my improved gear mechanism, fly or balance wheel, brake device, and a steering-wheel-locking mechanism attached. Fig. 2 is a bottom view of the machine, looking upward. Fig. 3 is a vertical section of a socket for securing the front steering-fork to the main portion of the frame, provided with a locking mechanism operated from one of the steering-handles to lock or hold said fork and the front wheel of the machine in certain positions. Fig. 4 is a horizontal section taken on line $x$ in Fig. 3. Fig. 5 is a side view of an adjustable bearing which I contemplate using on the machine, and Fig. 6 is a vertical section taken on line $y$ in said Fig. 5. Fig. 7 is a side elevation of part of the machine provided with a slightly-modified form of driving mechanism.

In the drawings, A A' represent the front and rear wheels of the velocipede; $A^2$, the fork or frame of the front wheel; B, the steering-post firmly secured to the fork $A^2$; B', the steering-socket secured on the main frame or reach C, connected with the rear wheel A'.

In Fig. 1, $c$ and $c'$ are the driving-cranks, provided on their free ends with the pedals $c^2$ and $c^3$. Said cranks are connected to a shaft $c^4$, rotating in bearings in the bifurcated frame C', (see Fig. 2,) and upon said shaft is arranged a fly or balance wheel $d$ and a gear $d'$.

As will be seen from Figs. 1 and 2, an intermediate gear $d^2$ connects the front driving-gear $d'$ with a rear gear $d^3$. Said gear is journaled on the shaft $d^4$, rotating in bearings in the one side of the frame C', said shaft being provided with a wheel $d^5$, connecting, by means of a link or chain or belt $d^6$, with a wheel $d^7$, to operate the rear wheel A' of the bicycle. Although said gear mechanism is shown on but one side of the machine, the gear can be duplicated, or the several gears or wheels on one shaft can be cast integral, as will be understood.

E is an upright saddle-post, provided in the upper end with a spring $e$, bent at $e'$, substantially as shown in Fig. 1, to which may be attached any form of seat, as will be evident.

Instead of the gear mechanism, as shown in Fig. 1, the wheel $d'$ can communicate its rotary motion by means of a belt $f$ with the wheel $d^3$. The shafts $c^4$ and $d^4$ can be arranged in adjustable bearings, as shown in detail in Fig. 5. Said bearings consist of the blocks $g$ and $g'$, made to fit upon one another in openings in the frame-work of the machine, being provided at their opposite ends with the plates $g^2$ and $g^3$, secured together by means of screws $g^4$, said plates being formed to embrace the upper and lower portions of the frame, as shown in Figs. 5 and 6, and set-screws $g^5$ working through threaded holes in lugs $g^6$ against lugs or projections $g^7$ on the plates $g^2$, whereby the bearings, and hence the shaft and gear-wheel or driving-wheel, can be readily adjusted.

The steering-post B is provided on its upper end with handles $b$ $b'$. To one of said handles, as $b$, is pivoted in a suitable clip $b^2$ a brake-handle $h$ for operating the brake H. Said brake is pivoted by means of a bell-crank $h'$ to the frame C, and a rod $h^2$ connects said crank $h'$ to a second crank $h^3$, secured to the main frame directly behind the steering-socket B', while a rod $h^4$ connects said crank with the free end of the brake-lever. When the brake-lever $h$ is depressed against the handle $b$, rod $h^4$ is depressed downwardly, which operates the bell-crank $h^3$ to pull the rod $h^2$ upward and cause the bell-crank $h'$ to force the shoe of the brake H against the periphery of the fly or balance wheel $d$. By this improved arrangement and construction the brake is entirely taken from the rubber tires of either the front or rear wheels of the machine, and hence they will last much longer than in the machines in which the brake-shoes are made to work against the tires of the front or rear wheels.

As will be seen from Figs. 3 and 4, I may provide the steering-socket B' with a locking device I for locking or holding the steering-wheel at any desirable angle. The fork $A^2$ terminates directly beneath the socket B' into the spindle $a$, which is formed directly above the steering-post B, being, however, of much smaller diameter, as shown. Said post and spindle $a$ are inserted through perforations in the bottom and top of the socket B', as shown in Fig. 3, a spring $a'$ being made to encircle the spindle $a$, upon which is arranged a perforated plate $a^2$, provided with rollers or balls $a^3$, forming an anti-friction bearing against the inner surface $B^2$ of the socket.

The locking device I consists, essentially, of a pin $i$, working through a slot $B^3$ in the socket B', and adapted to be forced into one of the elongated holes or recesses $a^4$ in the spindle $a$, coinciding with the slot in the socket. Said pin $i$ is connected with a crank $i'$, pivoted to the socket, and a rod $i^2$ connects said crank with a lever $i^3$, pivoted to the steering-handle $b'$. Compression-spring $i^4$ on said lever and spring $i^5$ on the crank $i'$ tend to normally force the pin $i$ into one of the holes in the spindle $a$.

A person desiring to steer the machine to one side grasps both the lever $i^3$ and the handle $b'$ in one hand and by the operation throws the pin $i$ out of its holding engagement with the spindle $a$, and when the wheel A has been turned into the desired direction the pin will again be forced into one of said elongated holes in the spindle until again operated by means of the lever on the handle $b'$. In this manner when the rider's hand rests lightly upon the handle, no matter in what position the wheel A may have been turned, it is held in that position until lever $i^3$ is depressed by the person riding the machine.

Having thus described my invention, what I claim is—

1. The combination, in a velocipede, with the wheels and the connecting-frame, of a driving mechanism consisting, essentially, of a pair of gear-wheels meshing one with the other, a sprocket-wheel arranged on the same shaft with one of said gear-wheels, a second sprocket-wheel, and a chain belt or its equivalent connecting said sprocket-wheels, substantially as and for the purposes set forth.

2. In a bicycle, the combination, with the wheels A and A' and the main frame, of a balance or fly wheel suspended in said frame, a gear $d'$, an intermediate gear $d^2$, meshing with a gear $d^3$, a wheel $d^4$ on the same shaft with gear $d^3$, a belt or link chain connected with a wheel $d^5$ on the axle of the wheel A', and a brake mechanism adapted to be forced into engagement with the periphery of said suspended wheel, substantially as and for the purposes set forth.

3. In a bicycle, the combination, with the wheels A and A' and the main frame, of a fly or balance wheel suspended in said frame, and a brake mechanism adapted to be forced into engagement with said wheel, consisting of a brake H, crank $h'$, rod $h^2$, crank $h^3$, rod $h^4$, and brake-handle $h$, being operated substantially as and for the purposes set forth.

4. The combination, with the steering-post and handle-bars, of a bearing-socket B', provided with a spring, and a bearing-plate having roller or ball bearings therein, as and for the purposes set forth.

5. The combination, with the steering-post and handle-bars, of a bearing-socket B', provided with a spring, and a bearing-plate having roller or ball bearings therein, and a locking mechanism whereby the said steering-post is locked in any desired position, as and for the purposes set forth.

6. The combination, with the steering-post and handle-bars, of a bearing-socket B', provided with a spring, and a bearing-plate having roller or ball bearings therein, and a locking mechanism whereby the said steering-post is locked in any desired position, said locking mechanism consisting, essentially, of a pin $i$, passing through an opening in said socket and extending into holes in said steering-post, a crank connecting said pin $i$ with a rod $i^2$, and a lever $i^3$, pivoted to one of the handle-bars, all of said parts operating substantially as and for the purposes set forth.

7. In a bicycle, the combination, with the wheels A and A' and the main frame, of a balance or fly wheel suspended in said frame, gear $d'$, intermediate gear $d^2$, meshing with a gear $d^3$, a wheel $d^4$ on the same shaft with gear $d^3$, and a belt or link chain connected with a wheel $d^5$ on the axle of the wheel A', as and for the purposes set forth.

8. In a bicycle, the combination, with the wheels A and A' and the main frame, of a balance or fly wheel suspended in said frame, gear $d'$, intermediate gear $d^2$, meshing with a gear $d^3$, a wheel $d^4$ on the same shaft with gear $d^3$, and a belt or link chain connected with a wheel $d^5$ on the axle of the wheel A', and a brake mechanism adapted to be forced into engagement with the periphery of the fly-wheel, as and for the purposes set forth.

9. In a bicycle, the combination of the wheels A and A' and the main frame, a shaft in said frame, a fly or balance wheel and a wheel or gear $d'$ on said shaft and pedals operating the same, and intermediately-arranged gears or wheels for communicating the rotary movement of the said fly-wheel and wheel $d$ to the rear wheel, as and for the purposes set forth.

10. In a bicycle, the combination of the wheels A and A' and the main frame, a shaft in said frame, a fly or balance wheel and a wheel or gear $d'$ on said shaft and pedals for operating the same, and intermediately-arranged gears or wheels for communicating the rotary movement of said fly-wheel and wheel $d'$ to the rear wheel, said wheels—viz., the fly-wheel, wheel $d$, and the intermediately-arranged wheels—being arranged in adjustable bearings sliding in the frame, substantially as and for the purposes set forth.

11. In a bicycle, the combination, with a brake-lever and the handle-bar, of a wheel $d$, arranged in the main frame of the machine in adjustable bearings, and means for operating said wheel, for the purposes set forth.

12. The combination, with the steering-post B, forked at its lower end and provided with a spindle $a$, having a series of openings or holes around its periphery and provided with handle-bars $b$ and $b'$, of a socket B', and a locking device, all of said parts operating substantially as and for the purposes set forth, whereby the steering-post can be locked at any angle.

13. The combination, with the steering-post B, forked at its lower end and provided with a spindle $a$, having openings or holes and provided with handle-bars $b$ and $b'$, of a socket B' and a locking device consisting, essentially, of a pin $i$, crank $i'$, rod $i^2$, lever $i^3$, and springs $i^4$ and $i^5$, as and for the purposes set forth.

14. In a bicycle, the combination, with the main frame, of a steering-frame pivoted thereto, extending through a socket on said main frame, and means operated from the steering-handles, engaging with a series of holes in the steering-frame in said socket to lock said frame in any desired position, for the purposes set forth.

15. The combination, with the main frame and a front steering and a rear driving wheel, of a crank-shaft arranged between the wheels, a fly or balance wheel on said shaft, and intermediately-arranged driving mechanism or wheels, all adjustably arranged in bearings in said main frame, consisting of boxes adjustably arranged in openings in said frame, sliding pieces at each end of said boxes, and adjusting screws to operate said sliding pieces, all arranged and operating substantially as and for the purposes set forth.

In testimony that I claim the invention set forth above I have hereunto set my hand this 13th day of April, 1891.

EMERY E. HARDY.

Witnesses:
 FREDK. C. FRAENTZEL,
 WM. H. CAMFIELD, Jr.